United States Patent [19]
Sarnecki et al.

[11] 4,448,761
[45] May 15, 1984

[54] PREPARATION OF ACICULAR, FERRIMAGNETIC IRON OXIDES

[75] Inventors: Wilhelm Sarnecki, Limburgerhof; Jenoe Kovacs, Bobenheim-Roxheim; Werner Loeser, Ludwigshafen; Peter Rudolf, Neuhofen; Guenter Vaeth, Limburgerhof, all of Fed. Rep. of Germany

[73] Assignee: BASF Aktiengesellschaft, Fed. Rep. of Germany

[21] Appl. No.: 435,369

[22] Filed: Oct. 20, 1982

[30] Foreign Application Priority Data

Nov. 5, 1981 [DE] Fed. Rep. of Germany ....... 3143870

[51] Int. Cl.$^3$ ............................................. C01G 49/08
[52] U.S. Cl. .................. 423/632; 252/62.56; 423/634
[58] Field of Search ............... 252/62.56; 423/632, 423/634

[56] References Cited

U.S. PATENT DOCUMENTS

| 3,399,142 | 8/1968 | Conley . | |
|---|---|---|---|
| 3,498,748 | 3/1970 | Greiner . | |
| 3,904,540 | 9/1975 | Bennetch et al. | 423/634 X |
| 4,176,172 | 11/1979 | Bennetch et al. | 423/634 |
| 4,213,959 | 7/1980 | Brodt et al. | 423/634 |

FOREIGN PATENT DOCUMENTS 51-20098 2/1976 Japan ................................... 423/634

*Primary Examiner*—Jack Cooper
*Attorney, Agent, or Firm*—Keil & Witherspoon

[57] ABSTRACT

Acicular ferrimagnetic iron oxides are prepared by a process in which iron (III) oxide hydroxide consisting essentially of lepidocrocite is reduced at from 350° to 600° C. by means of an organic compound which is a synthetic polymer with a molecular weight of from 3,000 to 40,000 to give magnetite, which, if desired, is subsequently partially or completely oxidized with an oxygen-containing gas at from 200° to 450° C.

2 Claims, No Drawings

PREPARATION OF ACICULAR, FERRIMAGNETIC IRON OXIDES

The present invention relates to a process for the preparation of acicular ferrimagnetic iron oxides by reducing iron(III) oxide hydroxide consisting essentially of lepidocrocite, at from 350° to 600° C., by means of an organic compound which is decomposable within this temperature range in the presence of iron oxide, to give magnetite and, if desired, then partially or completely oxidizing the magnetite with an oxygen-containing gas at from 200° to 450° C.

Acicular ferrimagnetic iron oxides, eg. magnetite and gamma-iron(III) oxide, have long been used extensively as magnetizable materials in the manufacture of magnetic recording media. A large number of processes for the preparation of the principally used product, gamma-iron(III) oxide, has been disclosed. For example, as early a publication as British Pat. No. 675,260 describes a process for obtaining gamma-iron(III) oxide, wherein acicular α-iron oxide hydroxide (goethite) is dehydrated to α-iron(III) oxide, the latter is converted to magnetite in a reducing atmosphere at above 300° C., and the magnetite is then oxidized in air at below 450° C., to give acicular gamma-iron(III) oxide. In the course of endeavors to improve the crystalline, mechanical and magnetic properties of such materials, this process has undergone several modifications with respect to its individual steps and the starting materials used.

It has also been disclosed that ferrimagnetic iron oxides can be prepared by heating an iron oxide hydroxide with an organic substance. In this process, the organic substance is decomposed, and the iron oxide hydroxide is reduced to magnetite which is then either itself used as a magnetic pigment or is oxidized to γ-iron(III) oxide in the manner described. In a process disclosed in as early a publication as German Pat. No. 801,352, non-magnetic iron oxides are converted into magnetite by treatment with salts of short-chain carboxylic acids and subsequent heating. According to U.S. Pat. No. 2,900,236, any organic compound which decomposes below 540° C., with little formation of ash and tar, may be used to reduce $\alpha$-$Fe_2O_3$ or $\alpha$-FeOOH. Subsequently, the reduction of α-iron oxides with organic substances, eg. higher hydrocarbons, alcohols, amines, fatty acids or salts thereof, oil, fat or wax, was described in a number of publications (German Laid-Open Application DOS No. 2,064,804, East German Pat. No. 91,017, and German Published Application DAS No. 1,203,656 and DAS No. 1,771,327). The reduction of γ-FeOOH with coconut oil fatty acid has also been described (German Published Application DAS No. 2,212,435). In these processes, it is essential to mix the organic compound thoroughly with the iron oxide, or to apply it as a very thin layer to the oxide. For this purpose, fatty acids in the form of their soaps can be dispersed in the suspension of the iron oxide, or precipitated as insoluble soaps, either during the preparation of the oxide (East German Pat. No. 91,017) or in a separate stage (German Published Applications DAS Nos. 1,771,327, 1,203,656 and 2,212,435). In the case of other organic compounds, it is advantageous, according to German Laid-Open Application DOS No. 2,064,804, if the α-iron oxide used is impregnated or coated with a liquid organic compound, excess of the latter is separated off, and the iron oxide is heated in a closed vessel. If a solid organic compound is to be used, it may be distributed uniformly by melting it or by dissolving it in a suitable solvent.

However, this type of reduction in the preparation of magnetic iron oxides does not give products which have any particularly advantageous magnetic properties. Thus, as, for example, German Pat. No. 2,212,435 discloses, only low coercive forces of less than 26 kA/m are achievable in the preparation of gamma-iron(III) oxide from lepidocrocite by reduction with an organic compound. To obtain higher coercive forces, additional measures, eg. reduction in a hydrogen atmosphere or heating of the lepidocrocite employed and subsequent conversion by means of an organic compound, are required (cf., inter alia, German Pat. No. 2,735,316 and German Laid-Open Application DOS No. 2,805,405).

The reduction of the iron oxide by means of an organic compound to give magnetite in the preparation of gamma-iron(III) oxide is certainly simpler to carry out than the reduction with hydrogen but, for the preparation of materials with improved magnetic properties, requires special measures and additional steps, including particularly homogeneous mixing of the reactants and separate dehydration, coating and heating of the iron oxides to be processed.

It is an object of the present invention to provide a process which does not have the disadvantages of these prior art processes but still gives an acicular ferrimagnetic iron oxide which has excellent magnetic properties, in particular a high coercive force, and, because of its uniform structure, is particularly suitable for the production of magnetic recording media which have a low noise level.

Although it was to be expected from the prior art that, in the preparation of acicular ferrimagnetic iron oxides by reducing iron(III) oxide hydroxide consisting essentially of lepidocrocite, at from 350° to 600° C., using an organic compound which is decomposable within this temperature range in the presence of iron oxide, the reduction giving magnetite which, if desired, is subsequently partially or completely oxidized with an oxygen-containing gas at from 200° to 450° C., all organic compounds would be equally suitable for this purpose, we have found that, surprisingly, this object is achieved in a particularly advantageous manner if the organic compound used for the reduction is a polymer with a molecular weight greater than 3,000.

In developing the novel process, it has been found that advantageous results are obtained in particular when organic compounds having a molecular weight of from 3,000 to 40,000 are used in an amount of from 0.8 to 15% by weight, based on the iron(III) oxide hydroxide.

On the basis of the prior art, any organic substance which is decomposable below 540° C. without producing residues of tar and ash should be a suitable reducing agent. The particular implication of this requirement is that preferred organic substances are especially those which have a low molecular weight, eg. paraffin wax (molecular weight 470), stearic acid (molecular weight 284) or castor oil (molecular weight 930).

The advantageous effect of the organic polymer employed in the novel process thus could not be foreseen. Appropriate organic polymers are compounds which contain carbon and hydrogen and may furthermore contain heteroatoms, eg. oxygen and nitrogen. It is particularly advantageous to use synthetic products, eg. polyethylenes, polypropylenes, polyesters, polyethers, nylons or polycarbonates, because they can be obtained with different molecular weights while product quality remains constant.

In carrying out the novel process, the iron(III) oxide hydroxide, which consists essentially of lepidocrocite, is mixed thoroughly, by mechanical means, with the high molecular weight organic polymer, which is usually in the form of granules, and reduction to give magnetite is then carried out for from 5 to 60 minutes at from 350° to 600° C. The reaction is advantageously carried out in a gentle stream of an inert gas in order to remove the water formed. The iron(III) oxide hydroxide employed may be either pure lepidocrocite or a mixture thereof with goethite, the mixture advantageously containing no more than 20% by weight of goethite.

The coercive force, which in accordance with the object of the invention should be high, can be influenced by the temperature, the periods of heating and of subsequent heating, and the amount and molecular weight of the organic compound. The coercive force is higher, the higher the temperature employed, the longer the periods of heating and of subsequent heating, and the smaller the amount and the higher the molecular weight of the organic substance used. When organic compounds with molecular weights of from 3,000 to 40,000 are used, the coercive force of the magnetic material obtained by the process shows a substantial increase as a function of the molecular weight. A further increase in the latter to values of, for example, 550,000 in the case of polyethylene does not produce a further increase in the magnetic values. The amount of organic substance to be used depends on its absolute carbon content. If, for example, 1% by weight, based on the iron oxide, of a pure hydrocarbon is sufficient to reduce completely the iron oxide, the amount of polyester used must be increased in proportion to its carbon content. The lower weight limit is determined by the minimum amount required for complete reduction of the iron oxide hydroxide to magnetite. It is about 0.8% by weight in the case of hydrocarbons. The optimum amount of an organic substance may be rapidly determined by preliminary experiments, and advantageously corresponds to 0.6-2.0% by weight of carbon. From this, the amount of organic substance can then be determined.

The temperature at which it is advantageous to carry out the novel process depends on the molecular weight of the organic compound employed. The list below gives the proportion of iron oxide hydroxide (in percent) which is reduced to magnetite on rapid heating (in the course of from 5 to 10 minutes) to the temperature $T_R$ with the organic compounds mentioned:

| Compound | Molecular weight | $T_R$ | % $Fe_3O_4$ |
| --- | --- | --- | --- |
| Paraffin wax | ~470 | 375° C. | 89% |
| Stearic acid | 284 | 370° C. | 84% |
| Castor oil | ~930 | 370° C. | 82% |
| Polyethylene | 3,000 | 370° C. | 35% |
| Polyethylene | 10,000 | 400° C. | 18% |
| Polyethylene | 20,000 | 408° C. | 14% |
| Polyethylene | 40,000 | 420° C. | 10% |
| Polyethylene | 350,000-550,000 | 405° C. | 8% |
| Nylon | 33,000 | 403° C. | 10% |
| Nylon | 33,000 | 495° C. | 89% |

While the low molecular weight compounds have about the same reducing effect regardless of their composition, compounds with molecular weights of about 3,000 and above retard the conversion of iron oxide to an ever increasing extent as the molecular weight increases, ie. reduction only begins at a higher temperature. When the molecular weight is further increased to about 40,000, no additional retardation of the reaction occurs. In addition, it has been found that although the reaction begins at a higher temperature when a substance with a high molecular weight is used, it then proceeds more rapidly as a result of this high temperature. Thus, while temperatures below 400° C. necessitate reaction times as long as one hour, periods of only a few minutes are sufficient for complete reduction at higher temperatures. Nevertheless, even when these high temperature are employed, it is advantageous to keep the product at this temperature for as long as about one hour, ie. to heat the magnetite obtained further, because this procedure produces a further increase in the $H_c$ value. Subsequent heating for longer periods is neither advantageous nor disadvantageous.

The magnetite obtained by the reduction is, if desired, then oxidized with an oxygen-containing gas, advantageously by passing air over it, at from 200° to 400° C., to give acicular ferrimagnetic iron oxides of the formula $FeO_x$, where x is from above 1.33 to 1.50. The oxidation is usually carried out to the stage of the gamma-iron(III) oxide (x=1.5).

The acicular ferrimagnetic iron oxide pigment prepared according to the invention, in particular the gamma-iron(III) oxide thus obtainable, differ distinctly from the gamma-iron(III) oxides obtainable by conventional conversion processes in having a higher coercive force and particles of particularly uniform shape; the obtention of these properties with the novel process is surprising. These improvements in the magnetic material also manifest themselves clearly in magnetic tapes produced from the materials, particularly in respect of their noise level.

To produce the magnetic layers, the gamma-iron(III) oxide is dispersed in a polymeric binder. Suitable binders for this purpose are conventional compounds, such as homopolymers and copolymers of vinyl compounds; polyurethanes; polyesters and the like. The binder is used as a solution in a suitable organic solvent, which may or may not contain other additives. The magnetic layers are applied to rigid or flexible bases such as disks, plastics films, and cards.

The Examples which follow illustrate the invention in comparison with experiments based on prior art. In the Examples and Comparative Experiments, parts and percentages are by weight, unless stated otherwise.

The magnetic properties of the pigment are determined on an oxide sample having a tamped density of $D=1.2$ g/cm$^3$, using a conventional vibrating sample magnetometer at 100 kA/m field strength. The coercive force ($H_c$) is expressed in [kA/m], and the specific remanence ($M_r/\rho$) and the specific saturation magnetization ($M_m/\rho$) in [nT m$^3$/g].

EXAMPLE 1

200 g samples of $\gamma$-FeOOH containing 8% of $\alpha$-FeOOH and having a BET surface area of 31.8 m$^2$/g, and the organic compound given in Table 1, were heated in a 2-liter rotating flask in a weak stream of nitrogen for the time and at the reduction temperature $T_R$ given in the Table; only in the case of Example 1h was the product further heated at the temperature $T_R$ for the stated time. Thereafter, the product was cooled to the oxidation temperature $T_{ox}$, and oxidized in a stream of air for the state time. The magnetic properties of the resulting gamma-iron(III) oxide samples are given in Table 1.

COMPARATIVE EXPERIMENT 1

The procedure described in Example 1 was followed, except that the organic compound employed for the reduction was stearic acid. The results are given in Table 1.

TABLE 1

| | Organic compound | Molecular weight | Proportion [%] | Heating time [min.] | $T_R$ [C.] | Period of subsequent heating [min.] | Oxidation Time [min.] | Oxidation Temp. [C.] | α-Fe$_2$O$_3$ $H_{c1.2}$ | α-Fe$_2$O$_3$ $M_m/\rho$ | α-Fe$_2$O$_3$ $M_r/\rho$ |
|---|---|---|---|---|---|---|---|---|---|---|---|
| Example 1a | Nylon | 33,000 | 3 | 30 | 450 | — | 30 | 350 | 28.6 | 79 | 45 |
| Example 1b | Nylon | 33,000 | 3 | 30 | 500 | — | 30 | 350 | 28.4 | 83 | 46 |
| Example 1c | Nylon | 33,000 | 3 | 30 | 550 | — | 30 | 350 | 28.8 | 80 | 45 |
| Example 1d | Nylon | 33,000 | 2 | 30 | 550 | — | 30 | 350 | 29.4 | 76 | 43 |
| Example 1e | Polyethylene | 3,000 | 2 | 12 | 550 | — | 60 | 300 | 26.3 | 76 | 43 |
| Example 1f | Polyethylene | 40,000 | 2 | 12 | 550 | — | 60 | 300 | 26.6 | 79 | 46 |
| Example 1g | Polyethylene | 40,000 | 2 | 30 | 550 | — | 60 | 300 | 27.6 | 78 | 45 |
| Example 1h | Polyethylene | 40,000 | 2 | 12 | 550 | 25 | 60 | 300 | 28.2 | 80 | 45 |
| Example 1i | Polyester | 25,000 | 4 | 33 | 550 | — | 30 | 350 | 27.5 | 84 | 47 |
| Comparative Experiment 1 | Stearic acid | 284 | 2 | 12 | 550 | — | 60 | 300 | 24.5 | 78 | 42 |

EXAMPLE 2

Using the procedure described in Example 1, 200 g samples of a γ-FeOOH having a BET surface area of 32.1 m$^2$/g were reduced, at 550° C., with 2% by weight of the organic compounds mentioned in Table 2. The products were then oxidized under a stream of air for 60 minutes at 350° C. to give γ-Fe$_2$O$_3$.

TABLE 2

| No. | Organic compound | Molecular weight | Heating time [minutes] | Period of subsequent heating [minutes] | $H_{c1.2}$ | $M_m/\rho$ | $M_r/\rho$ |
|---|---|---|---|---|---|---|---|
| a | Polyethylene | 40,000 | 48 | 12 | 30.0 | 78 | 45 |
| b | Polyethylene | 350,000–550,000 | 38 | 22 | 30.1 | 78 | 45 |

EXAMPLE 3

Using the procedure described in Example 1, 200 g of γ-FeOOH having a BET surface area of 31.8 m$^2$/g, and 15% by weight of a polyethylene glycol of molecular weight 8,500, were heated from 280° C. to 550° C. in the course of 33 minutes, and the product was then oxidized in a stream of air for 30 minutes at 300° C. The powder obtained had the following magnetic properties:
$H_{c1.2}=25.7$;
$M_m/\rho=74$;
$M_r/\rho=42$.

EXAMPLE 4

The reduction was carried out in a continuous rotary tubular furnace with 3 heating zones which were at 290°, 400° and 550° C. respectively, the temperature being measured in the middle of each heating zone. 3 kg of γ-FeOOH per hour, which beforehand had been mixed with 2% by weight of a polyethylene having a molecular weight of 40,000 for 1.5 hours on a roller stand, were passed through the 3 heating zones the total residence time being 45 minutes, under a weak nitrogen stream of 225 liters (S.T.P.)/hour. The magnetite obtained was then oxidized in a stream of air at 300° C., in a rotary tubular furnace. The gamma-iron(III) oxide obtained had the following magnetic properties:
$H_{c1.2}=28.6$
$M_m/\rho=80$
$M_r/\rho=45$

EXAMPLE 5

The procedure described in Example 4 was followed, except that the iron oxide hydroxide was mixed, before reduction, with only 1.5% by weight of the polyethylene, and the temperatures in the heating zones were 265°, 390° and 500° C. respectively. The magnetic properties of the gamma-iron(III) oxide obtained were as follows:
$H_{c1.2}=29.3$
$M_m/\rho=73$
$M_r/\rho=42$

EXAMPLE 6

In a 2-liter rotating flask, 196 g portions of γ-FeOOH containing 6% of α-FeOOH and having a BET surface area of 32.1 m$^2$/g, and 2% by weight of the organic compounds given in Table 3, were heated to 550° C. in the course of 35 minutes, in a weak stream of nitrogen, and the product was then oxidized in a stream of air for 1 hour at 300° C. The magnetic properties of γ-Fe$_2$O$_3$ obtained are given in Table 3.

TABLE 3

| Example | Organic compound | Molecular weight | α-Fe$_2$O$_3$ $H_{c1.2}$ | α-Fe$_2$O$_3$ $M_m/\rho$ | α-Fe$_2$O$_3$ $M_r/\rho$ |
|---|---|---|---|---|---|
| 6a | Polyethylene | 20,000 | 27.4 | 78 | 44 |
| 6b | Polyethylene | 40,000 | 28.1 | 78 | 44 |
| 6c | Polyethylene | ~250,000 | 28.3 | 79 | 45 |

EXAMPLE 7

In a 2-liter rotating flask, 196 g of γ-FeOOH containing about 8% of α-FeOOH and having a BET surface area of 32.7 m$^2$/g, and 4 g of polyethylene with a molecular weight of 250,000, were heated to 550° C. in the course of 37 minutes, in a weak stream of nitrogen. The resulting iron oxide had the composition FeO$_{1.34}$, and the following magnetic properties: $H_{c1.2}=29.5$, $M_m/\rho=87$ and $M_r/\rho=48$.

This powder was then oxidized for 30 minutes at 250° C. in a gas stream comprising, per hour, 100 liters of $N_2$ and 25 liters of air. The powder obtained had the composition $FeO_{1.44}$, and the following magnetic properties: $H_{c1.2}=29.9$, $M_m/\rho=84$ and $M_r/\rho=48$.

This powder was then oxidized for a further 15 minutes in the same $N_2$/air stream, and thereafter for another 30 minutes in a stream comprising only air. The powder obtained had the composition $FeO_{1.50}$, and the following magnetic properties: $H_{c1.2}=29.0$, $M_m/\rho=77$ and $M_r/\rho=44$.

EXAMPLE 8

27.7 parts of a 13% strength solution of a thermoplastic polyester-urethane obtained from adipic acid, butane-1,4-diol and 4,4'-diisocyanatodiphenylmethane, in a mixture of equal parts of tetrahydrofuran and dioxane, 12 parts of a 20% strength solution of a copolymer of vinyl chloride and an alkyl maleate in the same solvent mixture, 90 parts of a gamma-iron(III) oxide prepared as described in Examples 6a, 6b and 6c, 2.25 parts of a reaction product of a dimeric fatty acid a polyamine, as a dispersant, and a further 70.7 parts of the stated solvent mixture were dispersed for 2 hours in a stirred ball mill which had a capacity of 600 parts by volume and contained 1,800 parts of steel balls 4–6 mm in diameter. Thereafter, a further 50.8 parts of the stated polyester-urethane solution, 22 parts of the stated copolymer solution, 0.09 part of a commercially available silicone oil, 0.09 part of hydroquinone, 0.18 part of butyl stearate, 0.09 part of stearic acid and 12 parts of the stated solvent mixture were added, and dispersing was continued for a further hour. The dispersion obtained was passed under pressure through a filter of 5 μm pore size, 13.3 parts, per 100 parts of dispersion, of a 75% strength solution of a triisocyanate, obtained from 3 moles of toluylene diisocyanate and 1 mole of trimethylolpropane, in ethyl acetate were added, while stirring vigorously, and directly thereafter the mixture was applied to a 12 μm thick polyethylene-terephthalate film by means of a conventional knife coater. The coating was applied in a thickness such that the layer was 5 μm thick when dry. The coated film was passed through a magnetic field to orient the gamma-iron(III) oxide particles, dried, and then passed twice between heated rollers (90° C., 8 kg/cm) to compact and smooth the magnetic layer. After this procedure, the magnetic layer was 4 μm thick. The coated film was cut into 3.81 mm wide tapes, and the signal-to-noise ratio of these tapes was measured in accordance with DIN 45,512, Sheet 2, against IEC 1 reference tape R 723 DG. The results are given in Table 4.

COMPARATIVE EXPERIMENT 2

The procedure described in Example 8 was followed, except that 90 parts of a gamma-iron(III) oxide prepared as described in German Patent 2,735,316 and usually employed for the IEC 1 reference tape were used. The measured S/N ratio is given in Table 4.

TABLE 4

|  | S/N ratio [dB] |
| --- | --- |
| Example 8 |  |
| (oxide 6a | +1.2 |
| oxide 6b | +1.0 |
| oxide 6c) | +1.1 |
| Comparative Experiment 2 | 0 |

We claim:

1. A process for the preparation of an acicular ferrimagnetic iron oxide comprising reducing iron (III) oxide hydroxide consisting essentially of lepidocrocite, at from 350° to 600° C., by means of an organic compound which is decomposable within this temperature range in the presence of iron oxide, to give magnetite, wherein the organic compound employed for the reduction is a synthetic polymer having a molecular weight of from 3,000 to 40,000, used in an amount of from 0.8 to 15% by weight, based on the iron oxide hydroxide and selected from the group consisting of polyethylenes, polypropylenes, polyesters, polyethers, nylons and polycarbonates.

2. A process for the preparation of an acicular ferrimagnetic iron oxide comprising reducing iron(III) oxide hydroxide consisting essentially of lepidocrocite, at from 350° to 600° C., by means of an organic compound which is decomposable within this temperature range in the presence of iron oxide, to give magnetite, and then oxidizing the magnetite with an oxygen-containing gas at from 200° to 450° C. to give an acicular ferrimagnetic iron oxide of the formula $FeO_x$ where x is from above 1.33 to 1.50, wherein the organic compound employed for the reduction is a synthetic polymer having a molecular weight of from 3,000 to 40,000, used in an amount of from 0.8 to 15% by weight, based on the iron oxide hydroxide and selected from the group consisting of polyethylenes, polypropylenes, polyesters, polyethers, nylons and polycarbonates.

* * * * *